(12) United States Patent
Karppinen (10) Patent No.: US 11,654,870 B2
(45) Date of Patent: May 23, 2023

(54) ARRANGEMENT FOR CLEANING VEHICLE TIRES

(71) Applicant: TYRE WASH TWS OY, Oulu (FI)

(72) Inventor: Juha Karppinen, Oulu (FI)

( * ) Notice: Subject to any disclaimer, the term of this patent is extended or adjusted under 35 U.S.C. 154(b) by 0 days.

(21) Appl. No.: 17/633,203

(22) PCT Filed: Aug. 25, 2020

(86) PCT No.: PCT/FI2020/050551
§ 371 (c)(1),
(2) Date: Feb. 6, 2022

(87) PCT Pub. No.: WO2021/038132
PCT Pub. Date: Mar. 4, 2021

(65) Prior Publication Data
US 2022/0355767 A1  Nov. 10, 2022

(30) Foreign Application Priority Data

Aug. 26, 2019  (FI) .................................. 20197112

(51) Int. Cl.
| | |
|---|---|
| *B60S 3/04* | (2006.01) |
| *B08B 1/00* | (2006.01) |
| *B08B 1/02* | (2006.01) |
| *B08B 3/02* | (2006.01) |
| *B08B 13/00* | (2006.01) |

(Continued)

(52) U.S. Cl.
CPC .............. *B60S 3/042* (2013.01); *B08B 1/002* (2013.01); *B08B 1/02* (2013.01); *B08B 3/022* (2013.01); *B08B 13/00* (2013.01); *B60S 3/002* (2013.01); *F26B 21/004* (2013.01)

(58) Field of Classification Search
CPC ............ B60S 3/042; B08B 1/02; B08B 3/022
See application file for complete search history.

(56) References Cited

U.S. PATENT DOCUMENTS 5,341,828 A * 8/1994 Ferguson, Sr. .......... B08B 3/022
                                                    134/123
6,561,201 B1 * 5/2003 Midkiff .................... B60S 3/042
                                                    134/123

(Continued)

FOREIGN PATENT DOCUMENTS

| CN | 206841392 U | 1/2018 |
| DE | 202008001109 | 4/2008 |
| GB | 2342849 A | 4/2000 |

OTHER PUBLICATIONS

English language machine translation of CN206841392U.
English language machine translation of DE202008001109.

*Primary Examiner* — Shay Karls
(74) *Attorney, Agent, or Firm* — Jacob Eisenberg (57) ABSTRACT

An arrangement for cleaning the tires of a vehicle is described herein. The arrangement includes a gutter arrangement a strip arrangement and a brush mat arrangement on its upper surface. At one end of the arrangement is a nozzle arrangement that sprays or otherwise applies water onto the tire. The strip arrangement applies water to the tire and vibrates the tire to remove contaminants. The brush mat arrangement both cleans the tire and removes water from its surface. The water as well as the dirt and dust that has come off the tires accumulate in a collection basin under the brush mat arrangement. The arrangement is suitable for interiors of structures.

17 Claims, 4 Drawing Sheets

(51) Int. Cl.
  *B60S 3/00* (2006.01)
  *F26B 21/00* (2006.01)

(56) References Cited

U.S. PATENT DOCUMENTS

| | | | |
|---|---|---|---|
| 2002/0004961 A1* | 1/2002 | Nishina | B60S 3/042 15/53.4 |
| 2015/0307067 A1* | 10/2015 | Movsesian | B60S 3/042 15/210.1 |
| 2019/0344759 A1* | 11/2019 | Davis | B60S 3/042 |

* cited by examiner

ARRANGEMENT FOR CLEANING VEHICLE TIRES

CROSS REFERENCE TO RELATED APPLICATIONS

This application is a national phase of PCT/FI2020/050551, filed on Aug. 25, 2020, and further claims priority to Finnish Application 20197112, Filed Aug. 26, 2019, the content of both of which are herein incorporated by reference.

BACKGROUND OF THE INVENTION

Field of the Invention

The presently disclosed invention relates to an arrangement for cleaning vehicle tires, the arrangement having a nozzle arrangement configured to spray water onto a vehicle tire.

Description of Related Art

It is known that street dust and other contaminants are present in urban environments and such impurities adhere in particular to vehicle tires. Adhered to tires, these contaminants enter vehicle storage spaces.

Vehicle storage spaces are premises in buildings where vehicles are stored, for example, in night or day storage. Vehicles are also stored indoors for shorter periods, for example in connection with shops and workplaces. Further, as housing construction mainly takes place in urban agglomerations and city centers, vehicle parking spaces in courtyards and along streets are continuously becoming fewer and fewer. The trend is that vehicle parking is most often provided in parking spaces which are usually built below ground level in connection with residential buildings.

Every time a vehicle enters the parking space, its tires bring a wide variety of contaminants to the parking space floor. The dirt, in the form of dust, is raised up in the air and adheres to the walls and spreads over the entire area of the parking space. From the floor, these harmful particles are transported to people's apartments in their shoes and clothes. When cleaning and vacuuming garages, attention is usually paid only to cleaning the floor surfaces. The walls, pillars and ceiling remain uncleaned. As such, more and more of these harmful substances adhere to the structures. The cars get dirty as well. Often, air conditioning systems in garages are inadequate to filter such undesired particles, etc. from ambient air and/or are otherwise outdated, and they are often connected to the rest of the property's air conditioning system. Because of the interconnection, the system carries the dust in the air into homes and other areas of the property. This dust is called street dust.

Street dust is comprised of finely ground asphalt and sand, but it also contains substances such as soot particles, material released from car tires and other parts, as well as soil microbes. In addition, street dust contains pollen and organic microbes of animal origin. The street dust problem is at its worst in the spring in dry weather, with wind and traffic lifting dust accumulated on the streets into the breathing air. In spring, the dust is also rich in pollen. Street dust also includes particles from construction and renovation projects. These can be a year-round problem. Street dust is not a problem in large cities alone, as high concentrations of particulate matter can also occur in small municipal centers and agglomerations. Additionally, all of the aforementioned may be harmful to human and animal health as well as the respective environment generally.

To remove street dust from indoor parking garages and the like the floor surfaces are regularly washed. However, this is expensive and quite inefficient. The parking garage has to be emptied of vehicles, which is inconvenient. Enhancing air conditioning is also expensive and in the worst case it only spreads street dust to other parts of the building.

There are devices for washing vehicle tires. In general, these are difficult to fit in interiors such as parking garages. They require a lot of space to function properly and are generally implemented in such a way that their use induces additional problems such as noise, water spillage and significantly increased energy consumption. In addition, many of the known devices are such that it is practically impossible to install them in an existing space.

U.S. Pat. No. 5,341,828 discloses a system for washing vehicle tires, which system includes a plurality of sequentially arranged spray arrangements that spray water and detergent onto the tires. This system uses quite a lot of water and the tires of the vehicle that passes through the system spread a lot of water outside the system. The system is also quite difficult to fit into existing spaces.

U.S. Pat. No. 6,561,201 discloses an apparatus for washing vehicle tires. The apparatus has an elongated structure along which the vehicle is driven, and the bottom of the structure is filled with transverse impediments triangular in cross-section with holes for spraying water. This apparatus uses a significant amount of water and requires a powerful pump arrangement and motor to operate it. Furthermore, the water tank must be quite large. The apparatus also wets the vehicle so that water will inevitably spread outside the apparatus. The apparatus is therefore practically impossible to be installed indoors.

There is a clear need for an arrangement that could significantly reduce the entry of street dust into the interior through vehicle parking spaces. In addition, there is a need for an arrangement that can be installed in existing interior spaces.

BRIEF SUMMARY OF THE INVENTION

It is an object of the invention to provide a solution which can significantly reduce the disadvantages and drawbacks associated with the prior art. In particular, it is an object of the invention to provide a solution which is suitable for cleaning vehicle tire.

The objects of the invention are achieved by an arrangement which is characterized by what is set out in the independent claim. Some preferred embodiments of the invention are set out in the dependent claims.

The invention provides an arrangement for cleaning vehicle tires with a gutter arrangement having a strip arrangement and a brush mat arrangement on the upper surface. At one end of the arrangement is a nozzle arrangement that sprays or otherwise applies water onto the tire. The strip arrangement applies water to the tire and vibrates the tire to remove contaminants with the help of the weight of the vehicle and the rolling motion of the tire. The brush mat arrangement both cleans the tire and removes water from its surface. The water as well as the dirt and dust that has come off the tires accumulate in a collection basin under the brush mat arrangement. The arrangement is suitable for interiors.

When the text refers to the upper or lower side or similar directions, a situation is described in which the arrangement according to the invention is in its normal operating position.

An arrangement according to an embodiment of the invention for cleaning vehicle tires has a nozzle arrangement configured to spray water onto a vehicle tire. According to a preferred embodiment of the invention, the arrangement further comprises a gutter arrangement, a strip arrangement, and a brush mat arrangement. The gutter arrangement has a first end of the gutter arrangement and a second end of the gutter arrangement, and the nozzle arrangement or portions thereof are at least partially at or near the first end of the gutter arrangement. The nozzle arrangement is configured so that the active wetting of the tires takes place only in the first half of the gutter arrangement, i.e., in the half closer to the first end of the gutter arrangement. The strip arrangement includes a plurality of strips transverse to the direction of travel of the vehicle, configured to bend at least in the direction of travel of the vehicle as the vehicle tire passes over the strip and returns to its initial position after the tire passes the strip. The brush mat arrangement is water permeable, and the brush mat arrangement is closer to the second end of the gutter arrangement than the strip arrangement, and the arrangement further has a collection basin for collecting water, and the collection basin is at least partially below the brush mat arrangement. The strip arrangement both spreads water from the nozzle arrangement onto the surface of the tire and vibrates the tire slightly so that at least some of the particles and crumbs on the tire come off the tire. Also, some of the water drains through the strip arrangement. The brush mat arrangement removes water as well as street dust mixed with the water from the tire. The water and the street dust mixed with it drain through the brush mat arrangement into the collection basin.

In one embodiment of the arrangement according to the invention, at or near the first end of the gutter arrangement, there is a detection arrangement for detecting the position of the vehicle, and the detection arrangement is configured to at least switch on the nozzle arrangement.

In a second embodiment of the arrangement according to the invention, the strips of the strip arrangement have an upper edge of the strip and a lower edge of the strip, and the strip is attached to the gutter arrangement from or near the lower edge of the strip, i.e., the bottom part of the strip. This feature enhances the operation of the strip arrangement.

In a third embodiment of the arrangement according to the invention, there is a second strip arrangement at the second end of the gutter arrangement so that the brush mat arrangement is between the first strip arrangement and the second strip arrangement, and the second strip arrangement includes a plurality of strips transverse to the direction of travel of the vehicle, configured to bend at least in the direction of travel of the vehicle as the vehicle tire passes over the strip, and to return to its initial position after the tire passes the strip.

In a fourth embodiment of the arrangement according to the invention, the strips of the second strip arrangement are thinner than the strips of the first strip arrangement. The second strip arrangement enhances the release of water from the tire surface and thus minimizes the amount of water spread outside the arrangement.

In a fifth embodiment of the arrangement according to the invention, below the brush mat arrangement there is a grating structure to support the brush mat arrangement. When the brush mat as a whole stays roughly in place, its bristles wipe the surface of the tire more effectively.

In a sixth embodiment of the arrangement according to the invention, the grating structure is arranged so that the brush mat arrangement is separate from the water accumulating in the collection basin. This feature prevents water from accumulating in the brush mat arrangement and thus enhances the drying effect of the brush mat arrangement.

In a seventh embodiment of the arrangement according to the invention, the arrangement has two parallel gutter arrangements, which are configured to be positioned so that as the vehicle passes over the arrangement, the tires on one side of the vehicle pass through one gutter arrangement and the tires on the other side of the vehicle pass through the other gutter arrangement. This feature reduces the amount of material required for the arrangement and in some cases facilitates the placement of the arrangement in existing spaces.

In an eighth embodiment of the arrangement according to the invention, at least the gutter arrangement is configured to be placed on a surface.

In a ninth embodiment of the arrangement according to the invention, the first end of the gutter arrangement and the second end of the gutter arrangement have ramps. These features make it easier to place the arrangement in existing spaces, as it reduces the number of modifications to the floor and speeds up the installation of the arrangement.

In a tenth embodiment of the arrangement according to the invention, the upper surface of the gutter arrangement is at or near the floor level.

In an eleventh embodiment of the arrangement according to the invention, the length of the brush mat arrangement, i.e., the edge-to-edge distance in the direction of travel of the vehicle, is longer than the length of the strip arrangement or the length of the second strip arrangement. This feature enhances the removal of water and moisture from the tire.

In a twelfth embodiment of the arrangement according to the invention, the length of the brush mat arrangement, i.e., the edge-to-edge distance in the direction of travel of the vehicle, is approximately equal to or greater than the length of the circumference of the vehicle tire. This feature ensures that every point on the tire tread is cleaned and dried.

In a thirteenth embodiment of the arrangement according to the invention, the strips of the strip arrangement are separated from each other at their lower end so that dirt, dust, and small debris brought by the vehicle tire can fall through the strip arrangement. This feature enhances the collection of larger particles of street dust and also boosts the tire-vibrating effect of the strip arrangement.

In a fourteenth embodiment of the arrangement according to the invention, the nozzle arrangement or part thereof is at or before the strip arrangement in the direction of travel of the vehicle, and the collection basin extends at least partially below the strip arrangement or there is a connection to the collection basin below the strip arrangement. This feature enhances the water-spreading effect of the strip arrangement as well as the collection of water at the strip arrangement.

Yet another embodiment of the arrangement according to the invention further comprises compressed air means for drying the tires. Preferably, the compressed air means comprises a compressed air supply pipe to be connected to a compressed air source and drying pipes branching from the supply pipe with compressed air nozzles for directing the compressed air jet.

An advantage of the invention is that it provides an arrangement which is capable of substantially removing street dust from vehicle tires indoors. Also, the arrangement according to the invention can be easily placed in existing spaces without major alterations. The arrangement according to the invention can be made substantially shorter than the washing devices of the prior art without the washing result being significantly inferior.

The invention is also energy efficient. In addition, the amount of water it uses is small compared to the prior art. The invention is also easily scalable for vehicles of different sizes. With the apparatus according to the invention, the washing operation is fast and automatic. No additional action is required of the driver of the vehicle.

The invention also has the advantage that it can be used in different types of spaces.

A further advantage of the invention is that it does not spread water and dirt into its environment during use.

BRIEF DESCRIPTION OF THE SEVERAL VIEWS OF THE DRAWINGS

The invention is described in detail below. In the description, reference is made to the accompanying drawings wherein.

DETAILED DESCRIPTION OF THE INVENTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C", then, unless specifically stated otherwise or infeasible, the component may include A, or B, or C, or A and B, or A and C, or B and C, or A and B and C. Expressions such as "at least one of" do not necessarily modify an entirety of the following list and do not necessarily modify each member of the list, such that "at least one of 'A, B, and C'" should be understood as including only one of A, only one of B, only one of C, or any combination of A, B, and C.

The embodiments in the following description are exemplary only, and a person skilled in the art may implement the basic idea of the invention in a manner other than that explained in the description. The description may in several places refer to an embodiment or embodiments, but this does not mean that the reference in question is directed to one described embodiment only or that the feature described is useful in one described embodiment only. Individual features of two or more embodiments can be combined, thus creating new embodiments of the invention.

Figure 1:
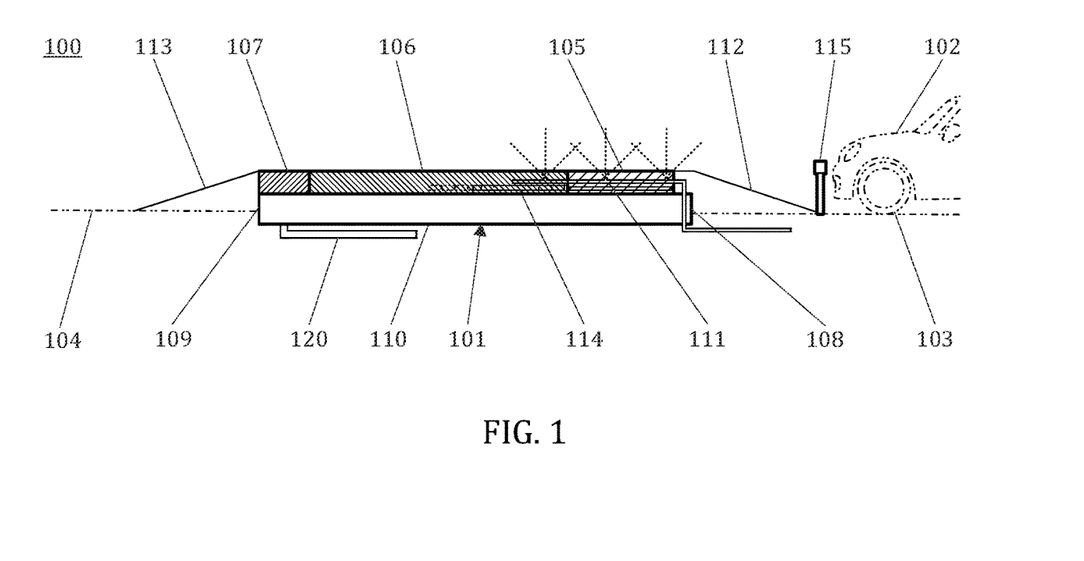
FIG. 1 depicts an example of an embodiment of an arrangement according to the invention seen from the side.

FIG. 1 depicts an arrangement 100 for washing the tires 103 of a vehicle 102. The arrangement comprises an elongated structure over which the vehicle runs in the longitudinal direction of the arrangement. In this example, the arrangement is partially above the floor surface 104.

Most of the dust in car parks and similar spaces is brought into the premises on vehicle tires and especially on tire surfaces that touch the street and road surfaces. Thus, cleaning the tires and recovering the dust and other dirt that has come off during cleaning substantially reduces the dirtiness of the parking garage. This reduces the need for cleaning and improves the air quality of the entire building. At the same time, vehicle dirtiness and health hazards are reduced.

The arrangement 100 has a gutter arrangement 101, a strip arrangement 105, a brush mat arrangement 106, a second strip arrangement 107, a nozzle arrangement 111 and a collection basin 110. The arrangement also includes a first ramp 112, a second ramp 113, a grating structure 114 and a detection arrangement 115. The arrangement includes cleaning surfaces. The cleaning surfaces of the arrangement are formed by at least the strip arrangement and the brush mat arrangement.

The gutter arrangement 101 is a structure having at least side walls and a bottom. These enclose a collection basin 110. The gutter arrangement has a first end 108 of the gutter arrangement and a second end 109 of the gutter arrangement. The gutter arrangement has structures that support the strip arrangement 105, the brush mat arrangement 106, and the second strip arrangement 107 at the upper part of the gutter arrangement. In some embodiments, the gutter arrangement, or at least a portion thereof, can be formed by shaping the surface on which the arrangement is placed. The gutter arrangement is made of a material that prevents water from escaping the collection basin. In addition, it must be sturdy enough to withstand the stresses involved and be able to support the other parts of the arrangement 100. For example, steel is one such material, but in some embodiments, at least a portion of the gutter arrangement may be made of materials other than metals, such as suitable plastics.

The first end 108 of the gutter arrangement 101 has a first ramp 112 and the second end 109 of the gutter arrangement has a second ramp 113. The arrangement 100 is configured so that the vehicle 102 can drive along the gutter arrangement so that all the tires in use of the vehicle pass through the gutter arrangement so that the arrangement is able to wash the tires. The ramps are positioned so that as, in the embodiment shown in the figure, the upper surface of the gutter arrangement is higher than the level of the floor 104, the vehicle can easily rise onto the gutter arrangement and exit the gutter arrangement. There are embodiments in which the gutter arrangement is positioned so that the upper surface of the gutter arrangement is at or near the floor level, in which case ramps are not required.

The nozzle arrangement 111 comprises a water pipe or pipes and at least one nozzle for spraying water onto the tires of a vehicle passing through the gutter arrangement. In some embodiments, the nozzle may be movable to direct the water jet. The nozzle arrangement is connected to a water supply system and the nozzles are configured so that the intrinsic pressure of the water supply system is sufficient to produce the desired water jets. There are also embodiments in which the arrangement 100 has its own water transport system with a water tank and a pump. The nozzle or nozzles of the nozzle arrangement are generally at the first end 108 of the gutter arrangement, i.e., at the end of the arrangement 100 from which the vehicle 102 enters the gutter arrangement. The nozzle arrangement is configured so that there are nozzles only on the first-end-side half of the gutter arrangement, i.e., the nozzles are between the middle point of the gutter arrangement and the first end of the gutter arrangement. In some embodiments, the nozzles are located on both sides of the tire line so that water is sprayed on both sides of the tire.

In the vicinity of the first end 108 of the gutter arrangement, in the direction of arrival of the vehicle 104, there is a detection arrangement 115 for detecting a vehicle approaching the arrangement 100. The detection arrangement includes means for switching on the nozzle arrangement 111 to spray water. The nozzle arrangement may be set to run for a certain period of time, or the arrangement 100 may have an additional arrangement for detecting the vehicle when it has passed the nozzles of the nozzle arrangement and then switching off the nozzle arrangement. The detection arrangement may comprise, for example, a photoelectric sensor, a magnetic sensor or a pressure sensor or some other similar means for detecting a vehicle. The detection arrangement may also have threshold values to cause it not to turn the nozzle arrangement on even if the detection arrangement detects something. In this way it is possible to prevent the spraying of bicycles, for example, if the arrangement is positioned so that the bicycles must also pass over the arrangement to access the parking space.

At or near the first end 108 of the gutter arrangement is a strip arrangement 105. The strip arrangement has a first end of the strip arrangement and a second end of the strip arrangement, and in this example, the first end of the strip arrangement is at the first end of the gutter arrangement. In this example, the strip arrangement extends from one side of the gutter arrangement to the other. In some other embodiments, the strip arrangement is configured so that the strip arrangement exists at least in sections of the gutter arrangement where the vehicle tire is intended to run. The strip arrangement includes a plurality of strips transverse to the direction of travel of the vehicle. The strips are made of a flexible material that changes shape when subjected to a force and returns to its former shape when the application of force ceases. Suitable materials include various plastic and rubber compounds. The strips are arranged so that in the unloaded state the successive strips are at least partially separated from each other, i.e., there is a space, in other words, a gap, between the successive strips.

The strips are configured to bend at least in the direction of travel of the vehicle as the vehicle tire passes over the strip and return to their initial position once the tire has passed. The strips are plate-like pieces with a horizontal top and bottom, a first side and a second side, and vertical sides. The first side of the strip faces the first end 108 of the gutter arrangement and the second side of the strip faces the second end 109 of the gutter arrangement. The strips are attached to the gutter arrangement 101 in such a way that the strips can move in the longitudinal direction of the gutter arrangement. This can be achieved by attaching the strips to the gutter arrangement or to the structures in the gutter arrangement from the lower edge of the strip or from the lower parts of the vertical sides or both. There are also embodiments in which the strip arrangement is modular, and the strip arrangement is attached as a whole to the gutter arrangement. What is essential in the strip arrangement is that as the strips move under the vehicle tire, the strips bend and flex under the weight of the vehicle and the rolling motion of the tire, and once the tire has passed, the strips return to their original position. In this way the strip arrangement causes an oscillating motion in the tire, which vibrates the tire. This causes dust and larger particles such as sand to come off the tire. The strip arrangement is configured so that the vibration it causes, for example for a passenger car, is so small that the vibration is not significantly uncomfortable to the driver of the vehicle. In addition to causing vibration, the strip arrangement applies water from the nozzle arrangement 111 to the surface of the tire. As the weight of the tire presses the strips together, water between them bursts out of the strip arrangement toward the tire. There are nozzles of the nozzle arrangement at least at the edges of the gutter arrangement at the location of the strip arrangement. In some embodiments, there are nozzles below the strip arrangement, with water being sprayed between at least some of the strips of the strip arrangement. This further enhances the application of water to the tire.

In this example, the strips of the strip arrangement 105 are vertical. In some embodiments, the strips of the strip arrangement are inclined toward the second end 109 of the gutter arrangement. This can enhance the spread of water. In some embodiments, the cross-section of the strip has a certain shaped design in its transverse direction. For example, there are embodiments in which the upper edge of the strip is narrower than the lower edge of the strip. The design of the strip can be used to control the bending and deformation of the strips, and, at the same time, the vibration and the spread of water caused by the strip arrangement.

The brush mat arrangement 106 has a first end of the brush mat arrangement and a second end of the brush mat arrangement. The first end of the brush mat arrangement faces the second end of the strip arrangement 105 and the second end of the brush mat arrangement faces the second end 109 of the gutter arrangement. The brush mat arrangement extends from one side of the gutter arrangement 101 to the other. The brush mat arrangement is water permeable. The brush mat arrangement has bristles and a mat base. The bristles are wire-like structures attached at one end to the mat base. The bristles are rigid, and they stand densely so that as the vehicle tire passes over the brush mat arrangement, the bristles bend more at the point of attachment to the mat. The bristles of the brush mat arrangement brush the tire and remove dust and other contaminants as well as water from it. In the bottom of the mat there are holes through which water and the contaminants it carries can pass. As an alternative or addition to the bristles attached to the mat base, the brush mat arrangement may comprise brush strips with bristles attached to the edge. These brush strips may be arranged in a position transverse to the direction of travel of the tire so that a gap is left between the brush strips through which water and dirt can drain through the brush mat arrangement. In some embodiments, there are nozzles of the nozzle arrangement 111 at the edges of the gutter arrangement 101 at locations of the brush mat arrangement, but they are in the vicinity of the first end of the brush mat arrangement. The majority of the nozzles of the nozzle arrangement are located in the section from the first end of the gutter arrangement to the middle of the gutter arrangement to avoid excessive wetting of the brush mat arrangement and to allow it to perform a drying function at least at its end, i.e., the part closer to the second end of the gutter arrangement 109. In some embodiments, there may be a cleaning aid in the water to be sprayed.

In this embodiment, the brush mat arrangement 106 is longer than the strip arrangement 105. In some embodiments, the length of the brush mat arrangement is approximately equal to or greater than the circumference of the tires to be cleaned so that the surface of the tire will be brushed at least for the most part. If the arrangement 100 is intended for cleaning passenger car tires, this length may be selected in some embodiments to be a minimum of about two meters (variation may be 10% in both directions).

In the example depicted by FIG. 1, there is a second strip arrangement 107 between the second end of the brush mat arrangement 106 and the second end 109 of the gutter arrangement. The second strip arrangement has a construction similar to that of the strip arrangement 105, but the strips of the second strip arrangement are closer together than the strips of the strip arrangement. Thus, the vibration caused by the second strip arrangement is weaker than the vibration caused by the strip arrangement. This will cause at least some of the droplets on the tire to come off. In some embodiments, the strips may also have different shapes. The second strip arrangement is used in embodiments where it is desired to add additional drying of the tire to the arrangement. This may be the case, for example, in situations where it is desired to shorten the overall length of the arrangement.

The upper surfaces of the strip arrangement 105, the brush mat arrangement 106 and the second strip arrangement 107 form at least a portion of the upper surface of the arrangement 100 at the gutter arrangement 101. The height of the strip arrangement, the brush mat arrangement and the second strip arrangement are less than the height of the gutter arrangement, i.e., the distance from the bottom of the gutter arrangement to its upper edge. The bottom of the gutter arrangement has a collection basin 110 for collecting water used for cleaning. The collection basin is at least partially below the brush mat arrangement. In some embodiments, the collection basin also extends below the strip arrangement and the second strip arrangement. In some embodiments, there are connections to the collection basin below the strip arrangement and the second strip arrangement. The gutter arrangement has a grating structure 114 that is below at least the brush mat arrangement. The grating structure separates the strip arrangement, the brush mat arrangement and the second strip arrangement from the collection basin. The grating structure is positioned so that the brush mat arrangement does not come into contact with the water in the collection basin in order to prevent the brush mat arrangement from getting unnecessarily wet. The grating structure is removable to facilitate the cleaning of the collection basin and maintenance of the arrangement. In some embodiments, the collection basin includes means for water management, such as a water level sensor or a drainage arrangement 120.

When the arrangement 100 is used for cleaning vehicle tires, the vehicle 104 is driven over the gutter arrangement 101. In the arrangement, a detection arrangement 115 in the direction of arrival of the vehicle detects the vehicle and activates the nozzle arrangement 111. Water is sprayed from the nozzles of the nozzle arrangement on the tires 103 of the vehicle and at least on the strip arrangement 105. As the vehicle tire crosses the strip arrangement, the strips of the strip arrangement vibrate the tire and spread water on the tire. The brush mat arrangement 106 further applies water to the surfaces of the tire at least at its initial end, i.e., at the end of the brush mat arrangement that is closer to the first end 108 of the gutter arrangement. Water can come to the brush mat arrangement either from the nozzle arrangement or on the wet tires, or in both ways. The bristles of the brush mat arrangement both clean and dry the tire. In some embodiments, there may be a second strip arrangement 107 at the second end 109 of the gutter arrangement, which vibrates and dries the tire. The vehicle exits the arrangement at the second end of the gutter arrangement. Due to the structure of the arrangement, it can be made substantially shorter than the washing equipment of the prior art and it is possible to reduce the amount of water spreading outside the arrangement, which means the dirt removed by the water cannot spread outside the arrangement.

Figure 2:
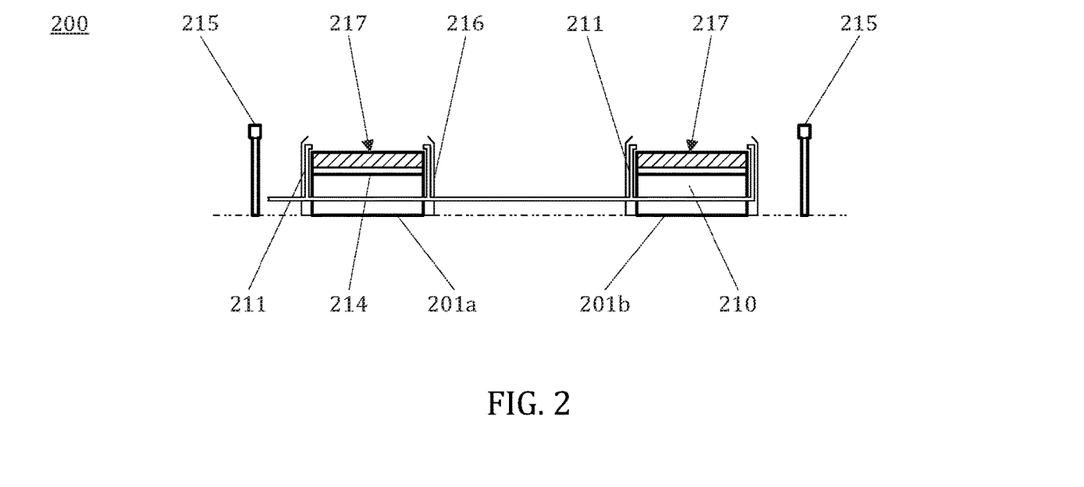
FIG. 2 depicts an example of a second embodiment of an arrangement according to the invention seen from the end.

FIG. 2 depicts an example of a second embodiment of the arrangement 200 seen from the end. The arrangement has two gutter arrangements: a first gutter arrangement 201a and a second gutter arrangement 201b. The gutter arrangements have a gutter arrangement frame 216 with at least edges and a bottom. The first gutter arrangement and the second gutter arrangement are positioned so that the tires on one side of the vehicle pass through one gutter arrangement and the tires on the other side pass through the second gutter arrangement as the vehicle travels along the arrangement, i.e., when the arrangement is used. The arrangement 200 further includes a detection arrangement 215, a collection basin 210, a grating structure 214, a nozzle arrangement 211, and cleaning surfaces 217 of the arrangement.

The frames 216 of the gutter arrangements enclose collection basins 210. The cleaning surfaces 217 are above the collection basins. The grating structure 214 is located between the cleaning surfaces and the collection basin and supports the cleaning surfaces. The frames of the gutter arrangements, and more specifically the upper parts of the edges of the frame, are shaped so that the water used in the wash splashes as little as possible outside the arrangement 200. In this embodiment, the upper parts of the edges of the frame are slightly inwardly bent, thereby directing water droplets and jets hitting the frame. In addition to the proximity of the edges of the frame, the nozzles of the nozzle arrangement 211 may also be below the cleaning surfaces 217.

Figure 3:
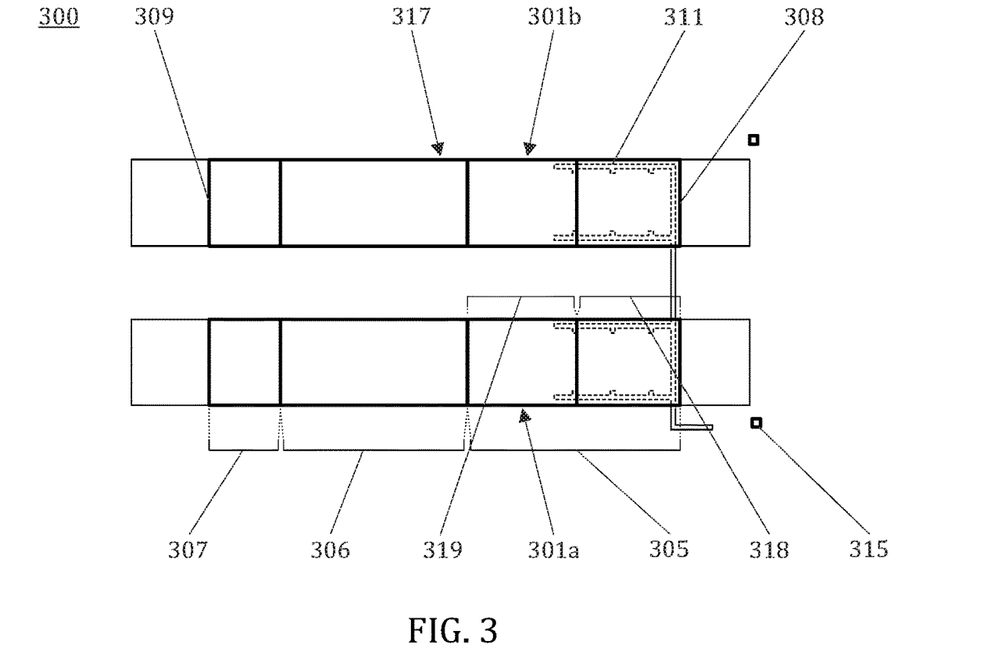
FIG. 3 depicts shows an example of a third embodiment of an arrangement according to the invention seen from above.

FIG. 3 depicts an example of a third embodiment of the arrangement 300 seen from above. The arrangement has two gutter arrangements: a first gutter arrangement 301a and a second gutter arrangement 301b. The gutter arrangements have a first end 308 of the gutter arrangement and a second end 309 of the gutter arrangement. The arrangement further includes a detection arrangement 315 and a nozzle arrangement 311. The gutter arrangements have cleaning surfaces 317 of the arrangement. In this embodiment, the cleaning surfaces comprise a strip arrangement 305, a brush mat arrangement 306, and a second strip arrangement 307.

The strip arrangement 305 includes a plurality of strips transverse to the direction of travel of the vehicle. The strips are made of a flexible material. The strip arrangement has a first end of the strip arrangement and a second end of the strip arrangement, and the first end of the strip arrangement is at the first end 308 of the gutter arrangement. The strips are attached to the frame of the gutter arrangement so that they can move in the direction of travel of the vehicle, i.e., parallel to the longitudinal axis of the gutter arrangement. The strips also flex in vertical direction. The strip arrangement includes a first part 318 of the strip arrangement and a second part 319 of the strip arrangement. The first part of the strip arrangement is closer to the first end 308 of the gutter arrangement than the second part of the strip arrangement. The thickness of the strips of the first part of the strip arrangement and their distance from the neighboring strips is greater than that of the strips of the second part of the strip arrangement. The first part of the strip arrangement vibrates the tire. The strips of the second part of the strip arrangement collect water between them and spread it on the vehicle tire as the strips press against each other as the vehicle tire passes over. Naturally, there may be several types of strips in the strip arrangement.

Figure 4:
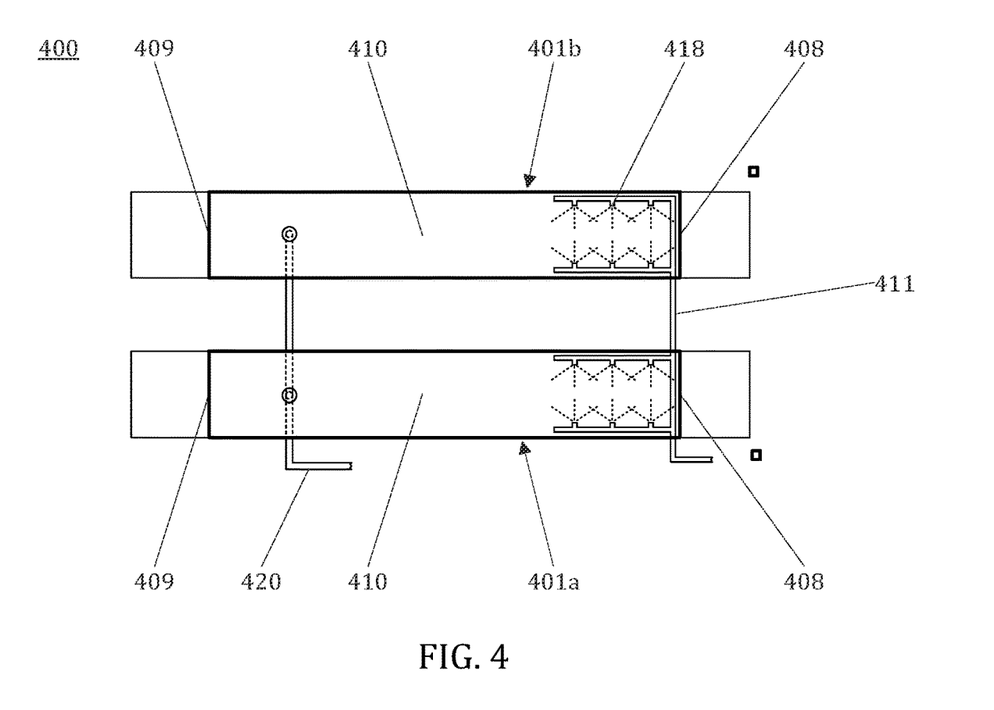
FIG. 4 depicts an example of a fourth embodiment of an arrangement according to the invention seen from above.

FIG. 4 depicts an example of a fourth embodiment of the arrangement 400 seen from above. The arrangement has two gutter arrangements: a first gutter arrangement 401a and a second gutter arrangement 401b. The gutter arrangements have a first end 408 of the gutter arrangement and a second end 409 of the gutter arrangement. The arrangement further includes a collection basin 410, a nozzle arrangement 411, and a drainage arrangement 420.

The nozzle arrangement 411 has a connection 419 to a water supply system and a plurality of nozzles 418. When the nozzle system is in operation, it sprays water from the nozzles. The nozzle arrangement and nozzles are configured so that the nozzles wet the vehicle tires as well as the cleaning surfaces of the arrangement. This wetting takes place at and near the first end of the gutter arrangements 401a, 401b, i.e., in the area where vehicles first enter when the arrangement is used. FIG. 4 shows water jets coming from the nozzles. In this example, the water jets form a crossed pattern. The water jets may be narrow or fan-shaped, for example. The nozzle system is arranged so that the active wetting of the vehicle tires, i.e., directly from the water jets, takes place only in the first half of the gutter arrangement, i.e. in the area from the middle of the gutter arrangement to the first end 408 of the gutter arrangement. In this way, the cleaning surfaces of the arrangement have time to dry the tires sufficiently to prevent significant amounts of water and moisture from spreading outside the arrangement.

The collection basin 410 may be common to the first gutter arrangement 401a and the second gutter arrangement 401b, or each gutter arrangement may have its own collection basin.

The collection basin 410 has a drainage arrangement 420 to remove water used for cleaning. The drainage arrangement may comprise filtration arrangements to separate dirt from the water. In some embodiments, water and other material accumulated in the collection basin can be removed from the collection basin by a vacuum cleaner or similar device when the structures covering the collection basin are removed. The drainage arrangement may also be connected to a sewage system or an external tank.

Figure 5:
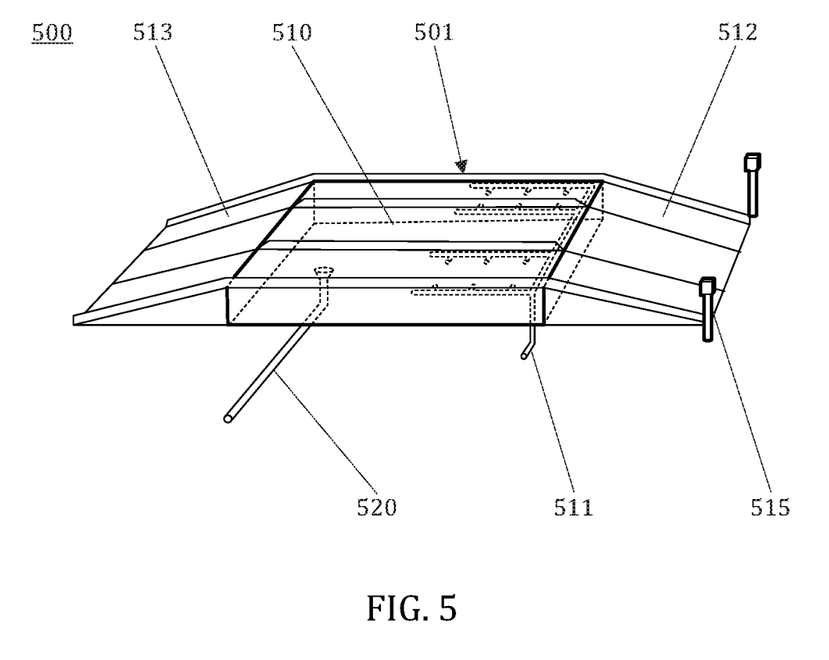
FIG. 5 depicts an example of a fifth embodiment of an arrangement according to the invention.

FIG. 5 depicts an example of a fifth embodiment of the arrangement 500. The arrangement includes a gutter arrangement 501, a nozzle arrangement 511, a collection basin 510, and a drainage arrangement 520. The arrangement also includes a first ramp 512, a second ramp 513, and a detection arrangement 515. The arrangement also has a cleaning surface that is on top of the gutter arrangement.

The arrangement 500 has one gutter arrangement 501 over which the vehicle drives. The nozzle arrangement 511 is configured to spray water onto the vehicle tires when the detection arrangement 515 has detected a vehicle driving to the first ramp 512. The nozzle arrangement is designed so that it has branches between which the tire passes as the vehicle crosses the cleaning surface. There are nozzles of the nozzle arrangement in these branches so that water can be sprayed towards each side of the tire. The cleaning surface may extend across the gutter arrangement from one side to the other, but there are also embodiments in which the cleaning surface only exists in places over which the vehicle tires pass. In this case, there are two strips of cleaning surfaces, and in some embodiments, there are support structures between them where parts of the nozzle arrangement can be attached. This support structure may also have service hatches or the like.

Figure 6:
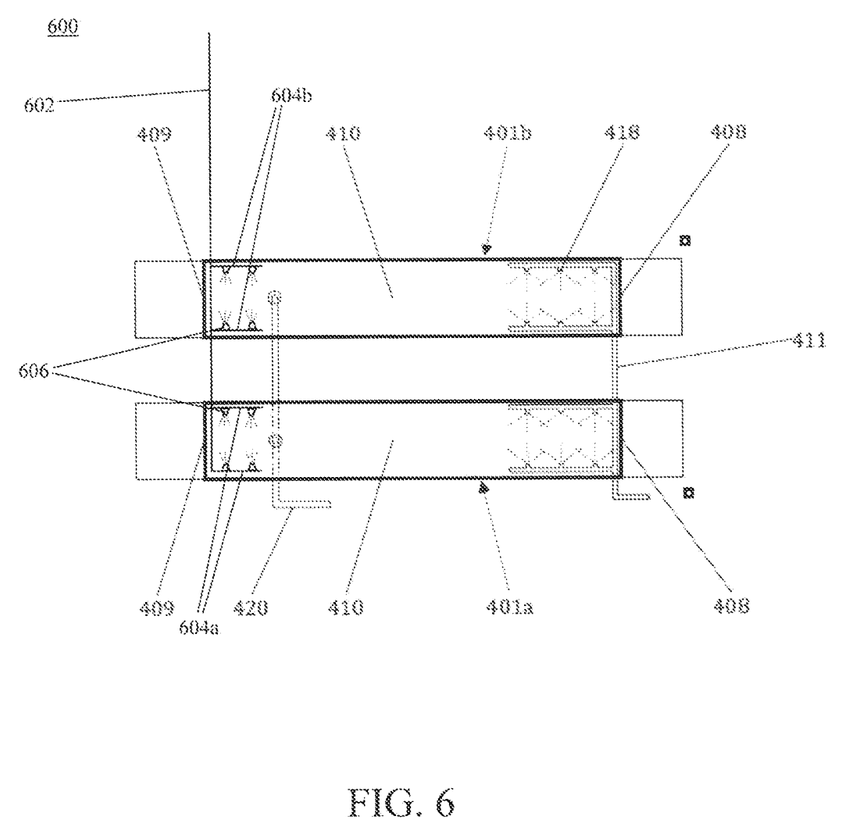
FIG. 6 depicts an example of a sixth embodiment of an arrangement according to the invention.

FIG. 6 depicts an example of a sixth embodiment of the arrangement 600 according to the invention. This embodiment comprises a first gutter arrangement 401a and a second gutter arrangement 401b according to the embodiment shown in FIG. 4, having a first end 408, a second end 409, a collection basin 410, a nozzle arrangement 411 and a drainage arrangement 420. The arrangement further comprises compressed air means for drying the washed tires. The compressed air means includes a compressed air supply pipe 602, the first end of which is designed to be connected to a compressed air source (not shown). At the other end of the supply pipe, drying pipes 604a, 604b branch so that the first drying pipes 604a extend inside the area defined by the edges of the second end 409 of the collection basin 410 of the first gutter arrangement 401a and the second drying pipes 604b extend within the area defined by the edges of the second end 409 of the collection basin 410 of the second gutter arrangement 401b. The drying pipes are located close to the opposite side walls of the collection basins so that the vehicle tire can pass between two parallel drying pipes. In the drying pipe wall, there are compressed air nozzles 606 which direct a jet of compressed air from the drying pipe towards the tire passing between the drying pipes. The drying pipes are at least partially below the running plane of the tires so that a compressed air jet can be applied to both the sidewall and the tread of the tires by means of the compressed air nozzles. The compressed air arrangement shown in FIG. 6 may be placed as such or slightly modified in connection with any of the various embodiments of the invention.

Some preferred embodiments of the invention have been described above. The invention is not limited to the solutions just described, but the inventive idea can be applied in numerous ways within the scope of the claims.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

What is claimed is:

1. An arrangement for cleaning the tires of a vehicle, the arrangement comprising:
   a nozzle arrangement configured to spray water onto the vehicle tire,
   a gutter arrangement,
   a strip arrangement and
   a brush mat arrangement, and
   wherein the gutter arrangement comprises a first end and a second end, and the nozzle arrangement or portions thereof are at least partially at or near the first end of the gutter arrangement,
   wherein the strip arrangement comprises a plurality of strips arranged transverse to a direction of travel of the vehicle, the strips comprising plate-like pieces configured to bend at least in the direction of travel of the vehicle as the vehicle tire travels over the strip, and to return to their initial position after the tire passes the strip,
   wherein the brush mat arrangement is water permeable and arranged closer to the second end of the gutter arrangement than the strip arrangement, and
   wherein the arrangement further comprises a collection basin configured for collecting water and arranged at least partially below the brush mat arrangement.

2. The arrangement according to claim 1, wherein at or near the first end of the gutter arrangement, a detection arrangement is arranged and configured for detecting the position of the vehicle, and the detection arrangement is further configured to at least turn on the nozzle arrangement.

3. The arrangement according to claim 1, wherein the strips of the strip arrangement comprise an upper edge of the strip and a lower edge of the strip, and the strip is attached to the gutter arrangement from or near at least one of the lower edge of the strip and the bottom part of the strip.

4. The arrangement according to claim 1, wherein the second end of the gutter arrangement further comprises a second strip arrangement configured such that the brush mat arrangement is arranged between the strip arrangement and the second strip arrangement, and the second strip arrangement further comprises a plurality of strips arranged transverse to the direction of travel of the vehicle and configured to bend at least in the direction of travel of the vehicle as the vehicle tire passes over the strip, and to return to its initial position after the tire passes the strip.

5. The arrangement according to claim 4, wherein the strips of the second strip arrangement are thinner than the strips of the strip arrangement.

6. The arrangement according to claim 1, wherein below the brush mat arrangement, a grating structure is arranged and configured to support the brush mat arrangement.

7. The arrangement according to claim 6, wherein the grating structure is arranged so that the brush mat arrangement is separated from the water accumulating in the collection basin.

8. The arrangement according to claim 1, further comprising two parallel gutter arrangements configured to be positioned so that as the vehicle passes over the arrangement, the tires on one side of the vehicle pass through one gutter arrangement and the tires on the other side of the vehicle pass through the other gutter arrangement.

9. The arrangement according to claim 1, wherein at least the gutter arrangement is configured to the positioned on top of a surface.

10. The arrangement according to claim 9, wherein the first end of the gutter arrangement and the second end of the gutter arrangement comprise ramps.

11. The arrangement according to claim 1, wherein an upper surface of the gutter arrangement is arranged at or near floor level.

12. The arrangement according to claim 1, wherein a length of the brush mat arrangement defining an edge-to-edge distance in a direction of travel of the vehicle is longer than a length of the strip arrangement.

13. The arrangement according to claim 1, wherein a length of the brush mat arrangement defining an edge-to-edge distance in the direction of travel of the vehicle is approximately equal to or greater than the circumferential length of the vehicle tire.

14. An arrangement according to claim 1, wherein strips of the strip arrangement are arranged separated from each other at their lower end so that dirt, dust and particles brought by the vehicle tire can fall through the strip arrangement.

15. The arrangement according to claim 1, wherein the nozzle arrangement or a part thereof is arranged at or before the strip arrangement in the direction of travel of the vehicle, and the collection basin is arranged to extend at least partially below the strip arrangement or there is a connection to the collection basin below the strip arrangement.

16. The arrangement according to claim 1 further comprising compressed air means for drying tires.

17. The arrangement according to claim 16, wherein said compressed air means comprises a compressed air supply pipe configured to be connected to a compressed air source, and drying pipes arranged to branch from the supply pipe with compressed air nozzles for directing the compressed air jet.

* * * * *